Feb. 15, 1966  R. E. EKSTROM  3,234,790
FLOWMETER
Filed Jan. 24, 1963  2 Sheets-Sheet 1
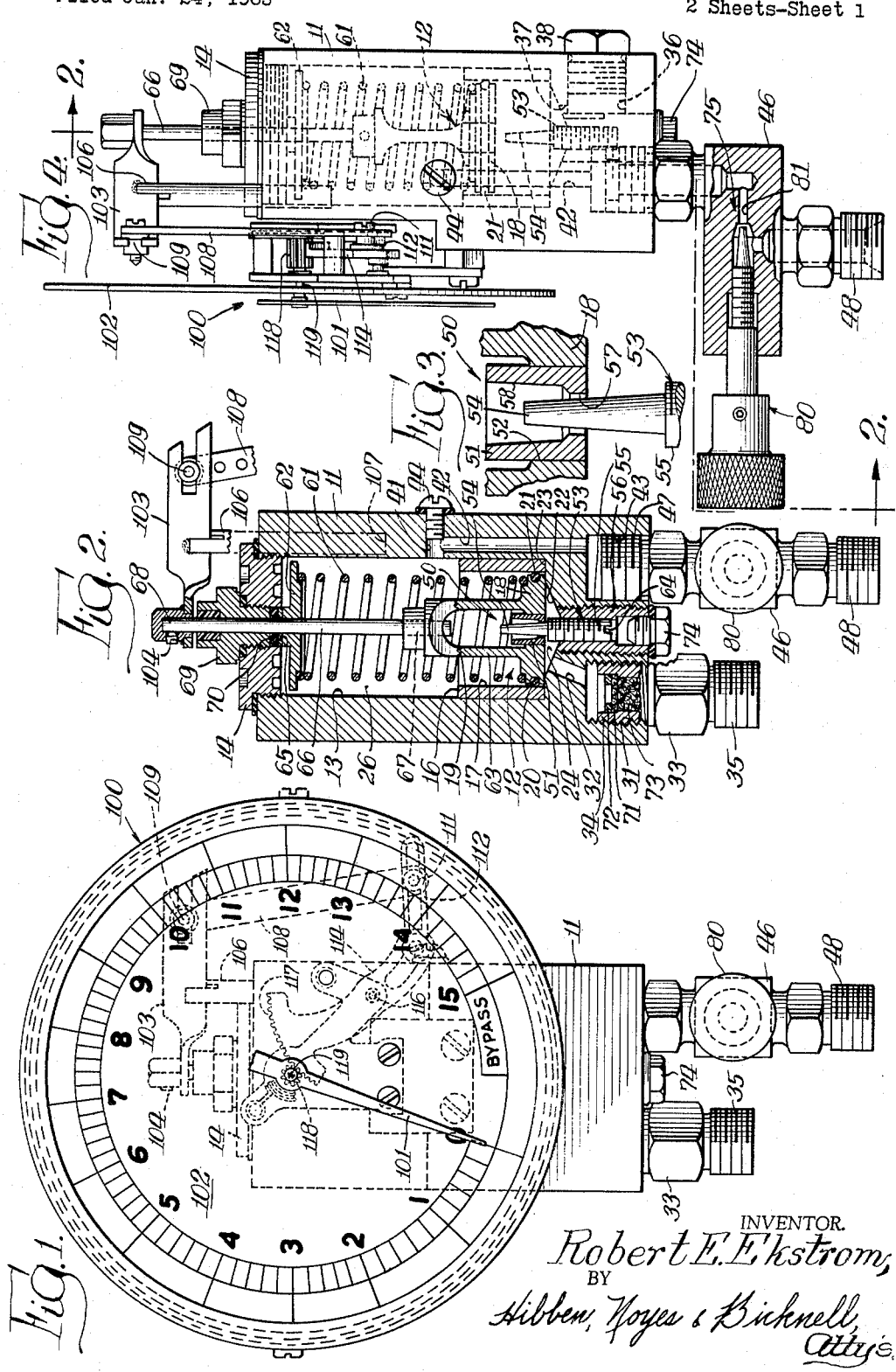
INVENTOR.
Robert E. Ekstrom,
BY
Hibben, Noyes & Bicknell
Attys.

Feb. 15, 1966 R. E. EKSTROM 3,234,790
FLOWMETER
Filed Jan. 24, 1963 2 Sheets-Sheet 2
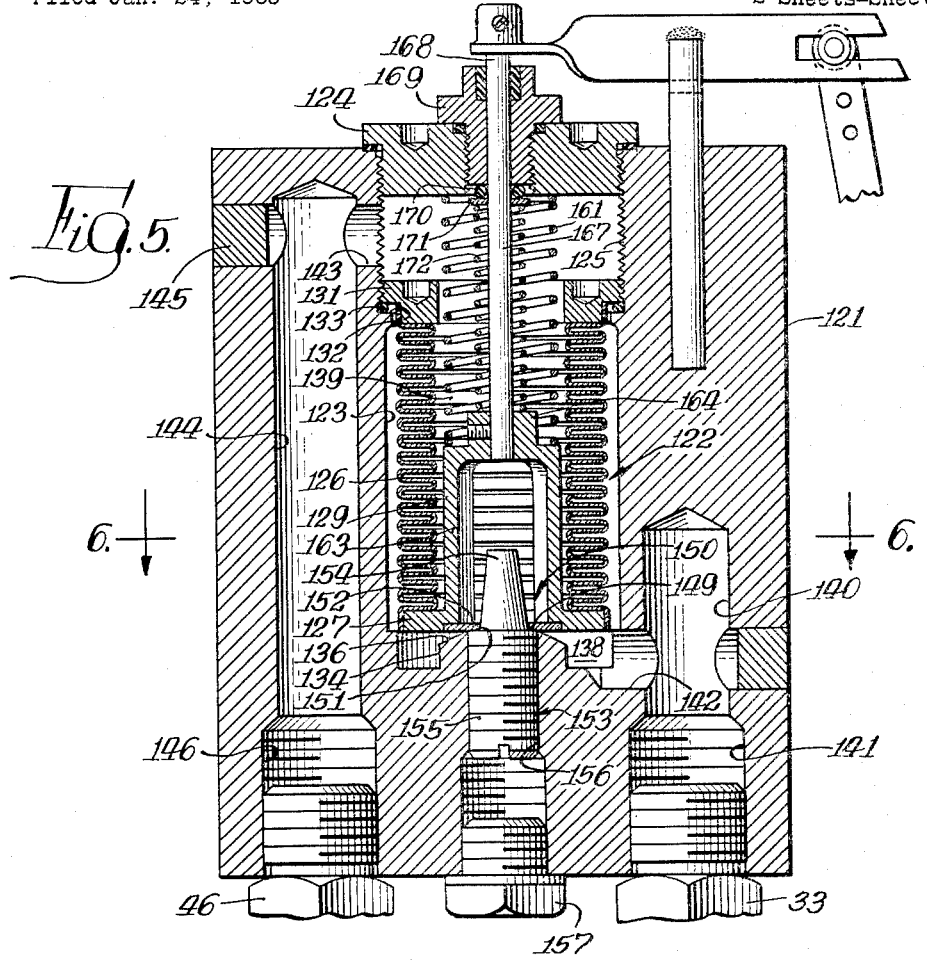
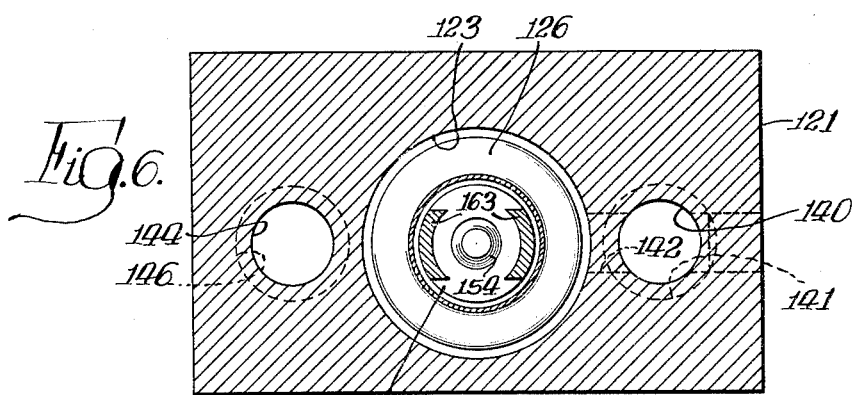
INVENTOR.
Robert E. Ekstrom,
BY
Hibben, Noyes & Bicknell
Atty's.

United States Patent Office 3,234,790
Patented Feb. 15, 1966

3,234,790
FLOWMETER
Robert E. Ekstrom, Chicago, Ill., assignor to Elematic Equipment Corporation, Chicago, Ill., a corporation of Illinois
Filed Jan. 24, 1963, Ser. No. 253,548
4 Claims. (Cl. 73—210)

This invention relates to a device for indicating fluid flow rates, and more particularly to an improved flowmeter.

Various types of fluid flow indicating devices or flowmeters have been made heretofore for providing a visual or graphic indication of the rate of fluid flow from a source thereof to a point of use. While most of these devices have proved generally satisfactory, many are incapable of accurately indicating low flow rates, and are not readily adaptable for use throughout different flow rate ranges without disassembly or substantial modification. In addition, many of such meters are incapable of providing an accurate reading when subjected to back-pressure unless the meter is recalibrated.

Accordingly, it is an object of the present invention to provide a novel fluid flowmeter that is adapted to accurately indicate fluid flow rates throughout a wide range of flows.

Another object is to provide a novel fluid flowmeter that is unaffected by back-pressure.

A further object is to provide a novel flowmeter that will accommodate pressure surges in the flow without damage to the device.

Still another object is to provide a novel flowmeter that is capable of operation throughout a wide temperature range.

A further object is to provide a novel fluid flowmeter functioning accurately even at low flow rates, and which avoids difficulties arising from the presence of heat or corrosive gases.

Other objects and advantages will become apparent from the following description and accompanying sheet of drawings, in which:

FIG. 1 is a front elevational view of a flowmeter embodying the features of the present invention;

FIG. 2 is a vertical sectional view of the meter illustrated in FIG. 1 and taken substantially on the line 2—2 of FIG. 4;

FIG. 3 is an enlarged fragmentary view of a portion of the flowmeter;

FIG. 4 is a side elevational view of the meter, with some parts in section;

FIG. 5 is an enlarged vertical sectional view, showing an alternate construction of a flowmeter embodying the features of the present invention; and FIG. 6 is a sectional view taken along the line 6—6 of FIG. 5.

Briefly described, the present invention contemplates an improved fluid flow indicating device or flowmeter for accurately indicating gaseous and liquid fluid flow rates. The flowmeter thus generally comprises an elongated housing having an inlet and an outlet and a movable pressure responsive means mounted in a central bore in the housing. The pressure responsive means, which in one form of the invention comprises a piston and in another form comprises a bellows, defines a pressure chamber on one side thereof and within the housing, the pressure chamber being connected to the inlet and hence to a source of fluid under pressure. A receiving chamber is defined on the opposite side of the pressure responsive means, which chamber is connected by means of a series of passages in the housing to the outlet and thence to a point of use for the fluid. In the form of the invention employing a piston, the receiving chamber comprises that portion of the cylinder bore above the piston, and in the form of the invention employing a bellows the receiving chamber comprises the interior of the bellows and that portion of the bore above the bellows. A fixed orifice means is associated with the inlet and an adjustable orifice means is associated with the outlet. Such fixed orifice means serves to reduce the pressure within the meter to a workable value. The adjustable orifice means associated with the outlet permits adjustment of the flow rate through the meter and hence of the amount of fluid flowing to the point of use, and also serves to prevent excessive off-scale readings during pressure surges.

According to the present invention, novel variable area orifice means is provided in the pressure responsive means to establish flow communication between the respective chambers in the housing. Such variable area orifice means is varied in its effective size upon movement of the pressure responsive means and comprises an opening in the pressure responsive means and an elongated member fixedly mounted in the housing and having a tapered portion adapted to extend into the opening. Movement of the pressure responsive means is caused by fluid pressure in the pressure chamber, and such movement is opposed by a coil spring. The elongated member is of such length that the pressure responsive means may move beyond the member to permit the opening therein to be completely unobstructed. Such relationship prevents damage to the device during pressure surges. The elongated member is removably mounted in the housing, from the outside thereof, so that the member may be easily removed for inspection or replacement with a similar member, or with another member having a differently tapered portion to thereby change the operating range of the meter.

In FIGS. 1 to 4, a flowmeter embodying the features of the present invention is illustrated. Such meter generally comprising a housing 11 in which a movable pressure responsive means, in this instance a slidably mounted piston assembly 12, is located. The housing 11 may be formed from an elongated block of material, such as aluminum or the like, the latter being provided with a longitudinal bore 13 extending inwardly from one end thereof. The upper or open end of the bore 13 is closed by a cover or closure 14 threaded into the end of the bore. Because the housing 11 is of aluminum and thus relatively soft, a tubular insert 16 of bronze or similar bearing material and having an accurately machined inner cylindrical surface 17 is inserted in the bore 13 in the lower end thereof to provide a wear-resistant and accurately dimensioned cylinder bore for the piston assembly 12. The insert 16 is, of course, unnecessary where the material of the housing 11 is such as is sufficiently hard to resist wear due to movement of the piston assembly.

The piston assembly 12 in the present instance comprises a disk portion or piston 18, and a yoke portion 19 to which additional structure hereinafter described is connected for indicating the position of the piston 18. The piston 18 has a diameter somewhat less than the internal diameter of the surface 17 and the circumferential edge of the piston 18 is provided with an annular recess 20 for receiving an O-ring 21 which slidably engages the surface 17 in sealing relation. The inner end of the bore 13 is provided with a conical recess 22 of somewhat lesser diameter than the diameter of the surface 17 to define a shoulder 23 to limit downward movement of the piston 18. The lower face of the piston 18 thus defines a pressure chamber 24 within the insert 16, which includes the recess 22. A receiving chamber 26 is also defined on the opposite side of the piston 18, the chamber 26 including the entire space within the bore 13 above the piston 18.

In order to provide an inlet in the housing 11 communicating with the chamber 24, the closed end of the housing 11 is provided with a threaded longitudinal bore 31, which is connected to the pressure chamber 24 by a short passage 32. A fitting 33 having an appropriately threaded end portion 34 is threaded into the bore 31 to provide for connection of the meter with a source of fluid under pressure.

In some installations of the present flowmeter, it may be desirable to connect the inlet fitting at the rear of the housing 11. Accordingly, the housing 11 includes another threaded transverse bore 36 (FIG. 4) at the rear of the housing, the bore 36 being of the same size and threading as the bore 31. A short vertical passage 37 connects the bore 36 with the chamber 24. When not in use, the bore 36 or second inlet, may be closed by a plug 38, as shown in FIG. 4, and when the bore 36 is in use, the plug 38 is screwed into the bore 31.

In order to provide an outlet, an outlet passage is formed in the housing 11. Such outlet passage, in the present instance, comprises a transverse bore 41 (FIG. 2) in the housing 11, communicating with the receiving chamber 26 at a point remote from the pressure chamber 24 and beyond the point of greatest travel of the piston 18. The upper end of a longitudinally extending bore 42 intersects the transverse bore 41, the outer end of the transverse bore 41 being closed by a screw 44 threaded in the bore 41. The lower end of the bore 42 constitutes an outlet and is enlarged and threaded as at 43. A fitting 46 having a threaded end portion 47 is threaded into the threaded bore 43 to provide for connection of the meter with a point of use for the fluid.

According to the present invention, the piston 18 includes variable area orifice means, indicated generally at 50 (see FIGS. 2 and 3), for connecting the chamber 24 with the chamber 26 to measure the rate of fluid flow therebetween as a function of the position of the piston 18 and thus of the pressure difference between the chambers 24 and 26. The variable area orifice means 50, in the present instance, is located centrally of the piston 18 and comprises an orifice or opening 57 in the piston and a fixed member 53 mounted in the housing. The member 53 has a portion 54 of varying cross sectional area, such portion in this instance tapering toward its upper end and extending into the orifice 57 coaxially therewith so that, as the piston moves upwardly, the effective size of the orifice 57 is increased. The member 53 preferably has a lower portion 55 threaded into a bushing 56 threaded into the closed end of the housing 11. The orifice 57 is preferably formed in an insert 51 press fitted into an opening 52 in the piston 18. The opening 57 is of relatively short axial length, and above the orifice 57 the insert 51 is provided with an enlarged passage which is tapered outwardly as at 58, to minimize wall effects downstream of the orifice 57.

It will thus be apparent that movement of the piston 18 upwardly or away from the shoulder 23 will provide a progressively greater effective area for the variable area orifice means 50. Such movement of the piston 18 is caused by the pressure of the fluid in the chamber 24 and is opposed by the weight of the piston assembly 12 and the force of a coil spring 61 mounted in the chamber 26. In the present instance, the spring 61 has its lower end seated on the upper face of the piston 18, as shown in FIG. 2, the upper end of the spring engaging a disk 62 held adjacent the closure 14 by the spring.

With the foregoing construction, it will be apparent that a supply of fluid under pressure entering the chamber 24 from the inlet 31 will act upon the lower face of the piston 18, against the weight of the piston assembly 12 and the force of the coil spring 61, to cause the piston to move off its seat. The piston 18 will thus move upwardly to an equilibrium position, such as is illustrated in FIG. 3, where the aforementioned forces are counterbalanced by the force of the difference in pressure in the chambers 24 and 26 acting on the piston 18. Such pressure difference of course depends on the effective size of the variable area orifice 50. Thus, the position of the piston 18 is a function of the effective size of the variable area orifice means 50 and therefore of the rate of fluid flow between the inlet 31 and outlet 39, such position providing a convenient means for indicating such flow rate.

The yoke 19 of the piston assembly 12, has a pair of transversely spaced legs 63 which extend upwardly from the piston 18 and have their ends spaced sufficiently to accommodate the tubular insert 51 therebetween. The length of the legs 63 is such that the body of the yoke is spaced a substantial distance from the orifice 57 and thus will not interfere with flow of fluid therethrough. A rod 66 has its lower end 67 secured to the upper end of the yoke 19, the rod 66 being of such length as to extend through the closure 14 and a bushing 69 threaded therein, with the upper end 68 of the rod extending above the bushing. In order to prevent leakage between the rod 66 and bushing 69, a seal comprising a washer 65 and an O-ring 70 may be disposed around the rod 66 and between the adjacent faces of the spring disk 62 and the bushing 69. The upper end 68 of the rod is adapted to be connected to a mechanism responsive to the position of the piston 18 for indicating the rate of fluid flow through the meter, as will be described hereinafter.

As previously mentioned, the present flowmeter is adapted for use throughout a wide range of flow rates. Such feature is achieved by substituting for the elongated member 53, members having tapered portions 54 of different degrees of taper. Thus, where the meter is to be used in an application where a wide range of flow rates will be encountered, a member 53 will be employed in which the angle of taper of its portion 54 is comparatively great. Movement of the piston 18 will thus effect a much greater variation in the area of the variable area orifice means 50, thereby providing for a greater variation in rate of fluid flow through the meter for a given travel of the piston 18. Conversely, if the meter is to be used in an application where a comparatively narrow range of flow rates will be present, a member 53 will be employed having a relatively small angle of taper of its portion 54. Consequently, the same amount of travel of the piston 18 with the latter type of member 53 will have a proportionately lesser effect on the area of the variable area orifice means 50. Substitution of different members 53 having different tapered portions 54 is easily accomplished by unscrewing the member 53 from the bushing 56, the member 53 having a screw driver slot 64 in its lower end for this purpose. Thus, the member 53 is readily replaceable from the outside of the housing 11. A threaded plug 74 may be inserted in the open end of the bushing 56.

In order to prevent damage to the piston assembly 12 and the associated flow rate indicating means to be hereinafter described, upon the initiation of flow, or whenever a pressure surge reaches the chamber 24, the tapered portion 54 has a length such that it will be completely withdrawn from the orifice 57 before the piston 18 reaches its upper limit of travel. Such position is illustrated in dotted lines and indicated at 18 in FIG. 4. When so positioned, the orifice 57 in the piston is completely unobstructed and a very rapid equalization of pressure or fluid by-passing occurs between the chambers 24 and 26. Further upward movement of the piston is thus prevented.

With the foregoing construction, it will be apparent that the flowmeter of the present invention is capable of measuring flow rates where the pressure difference across the variable area orifice means 50 is not so great as to cause the piston 18 to move to its by-pass position such as is illustrated in FIG. 4. If the pressure at the source is excessive, it is necessary to provide means for maintaining a workable pressure differential across the variable area orifice means 50 during steady flow conditions, as well as at the initiation of flow or during surges.

Thus, in order to prevent excessive pressure increases in the chamber 24 when fluid flow is initiated through the meter, or during surges in the flow, fixed orifice means associated with the inlet of the chamber 24 is provided. While such fixed orifice means may be located at any point between the fluid source and the meter, in the present instance such means is mounted in the inlet fitting 33. As will be apparent from FIG. 2, the fixed orifice means comprises a screen 71 mounted in the threaded end portion 34 of the fitting 33 and retained therein by a washer 72 pressed into the end of the portion 34 of the fitting. Filter material 73, such as sintered bronze, or the like, may be provided in the fitting 33 upstream of the screen 71 to prevent passage of foreign particles into the meter and possibly to the point of use for the fluid. The effective size of the fixed orifice means in the inlet 31 thus depends upon the mesh of the screen 71, the size of the opening in the washer 72, and to some extent the porosity of the filter material 73. However, the effective size of the fixed orifice means must be equal to or smaller than the effective size of the variable area orifice means 50.

In order to permit adjustment of the flow through the meter and thus the flow to the point of use thereof, and to prevent excessive off-scale readings during flow surges, adjustable orifice means, indicated generally at 75 in FIG. 4, is associated with the outlet of the meter. In the present instance, such adjustable orifice means is provided in the fitting 46. The adjustable outlet orifice means 75 comprises an adjusting member in the form of a needle valve 80 for controlling the effective size of a bore 81 forming a part of a passage through the fitting 46. Adjustment of the needle valve 80 will thus control the effective size of the bore 81 and thus the rate of flow through the meter.

As previously mentioned, the present flow meter is adapted to provide a visual indication of the fluid flow rate therethrough. Thus, in the present instance, the rod 66 is adapted to be connected to actuating linkage of an indicator shown generally at 100 in FIG 1, to cause movement of a hand 101 across a dial 102. The dial 102 is provided with indicia indicating the flow rate in terms of appropriate units. The actuating linkage for the meter 100, in this instance, includes a transversely arranged arm 103 having a hub secured to the upper end 68 of the rod 66 by means of a set screw 104. A longitudinally arranged guide rod 106 is secured at its upper end to the arm 103 intermediate the ends thereof and is slidably mounted in a longitudinal bore 107 in the housing 11. The rod 106 thus prevents misalignment or binding of the rod 66 during reciprocation thereof. A link 108 has its upper end pivotally connected, as at 109, to the arm 103, and its lower end pivotally connected, as at 111, to another link 112 (FIGS. 1 and 4). The link 112 is rigidly secured to one end 113 of a lever 114. The lever 114 is pivoted intermediate its ends, as at 116, and is provided with a gear sector 117 at its opposite end, which meshes with a pinion 118 secured to a shaft 119 to which the hand 101 is connected. Thus, movement of the rod 66 effects a corresponding movement of the hand 101. The indicator 100 thus comprises means responsive to the position of the piston assembly 12 for indicating the fluid flow rate through the meter. If desired, limit switches or other means actuated by the indicator 100 may be provided for indicating variations in a flow which exceed certain maximum and minimum rates. Such means or limit switches may be utilized to actuate means providing an audible signal, or means for readjusting the flow to the desired range.

In describing the operation of the present flowmeter, it will be assumed that an appropriate valve member 53 has been threaded into the bushing 56 for the particular range of flow rates to be measured, and that inlet and outlet fittings 33 and 46 have been respectively connected to a source of fluid under pressure and a point of use for such fluid. The needle valve 80 is then opened to permit flow. Upon the initial opening of the valve 80, a surge of fluid under pressure will enter the inlet fitting 33, the connecting passage 32, and thence to the chamber 24 beneath the piston 18. The presence of the fixed orifice means 71, 72 in the inlet fitting 33 serves to prevent excessive pressure in the chamber 24.

Fluid under the pressure in the chamber 24 flows through the variable area orifice means 50, defined by the opening 57 and the tapered portion 54 of the member 53, to the chamber 26 on the opposite side of the piston 18. The effective size of the variable area orifice means 50 depends upon the position of the piston 18 relative to the tapered portion 54 and thus the pressure difference between the chamber 24 and the chamber 26, the weight of the piston assembly 12 and the force of the coil spring 61. If a large pressure difference is developed, either due to the initial opening of the needle valve 80, or a subsequent pressure surge from the source, the piston 18 will be shifted rapidly upwardly to the position illustrated in dotted line in FIG. 4. When so positioned, the tapered portion 54 becomes completely withdrawn from the opening 57 and fluid pressures in the chambers 24 and 26 will quickly equalize. The hand 101 of the meter 100 will also be within the zone identified as "by-pass" on the dial at this time. As soon as the pressure surge has dissipated, the piston will again return to a stable operating position such as is illustrated in FIG. 3. The adjustable needle valve 80 controls the flow rate through the meter.

The operating range of flow through the meter may be readily changed by substituting a member 53 having a different angle of taper of its portion 54, thereby changing the variation of the variable area orifice means 50 with a given movement of the piston 18. A corresponding calibration factor must be applied to the reading obtained from the indicia on the meter face 102.

In FIGS. 5 and 6, an alternate construction of the flowmeter is illustrated. Such alternate construction comprises genreally a housing 121 in which a movable pressure responsive means, in this instance an extensible and contractible bellows assembly 122, is located. The housing 121 may be formed from a block of material, such as aluminum or the like, the latter being provided with a central longitudinal bore 123 extending inwardly from the upper end thereof. The open end of the bore 123 is closed by a closure or cap member 124 threaded into the upper end, indicated at 125, of the bore 123.

The bellows assembly 122, in the present instance, comprises an elongated tubular bellows 126 of the type having an axially convoluted side wall. The bellows 126 has a diameter somewhat less than the internal diameter of the major portion of the bore 123, which is cylindrical, so that the bellows 126 is loosely received within the bore 123. The lower end of the bellows 126 is closed by an annular member 127 having an integral yoke portion 129 formed therewith and extending upwardly into the bellows 126. A ring member 131 is secured to the upper end of the bellows 126 and is externally threaded for engagement with the threaded upper end 125 of the bore 123.

In order to locate and fixedly secure the upper end of the bellows 126 in the bore 123, the latter includes an annular radially inwardly extending shoulder 132 at the lower end of the threaded portion 125, and annular seal means such as an O-ring 133 is interposed between the ring member 131 and shoulder 132 to prevent fluid leakage at this point. The inner or lower end of the bore 123 includes a central upstanding boss 134 having a beveled end face 136. The lower face of the annular member 127 thus defines a pressure chamber 138, and a receiving chamber 139 is defined on the opposite side of the ring member 127, the chamber 139 including the space within the bellows 126 and the space within the bore 123 above the ring member 131.

In order to provide an inlet in the housing 121 communicating with the chamber 138, the lower end of the housing 121 is provided with a longitudinal bore 140 which is enlarged and threaded as at 141 to receive an inlet fitting, such as the fitting 33 of the previously described embodiment. The bore 140 is connected to the pressure chamber 138 by a short transverse passage 142. The fitting 33 provides for the connection of the meter with a source of fluid under pressure, in the manner of the previous embodiment.

In order to provide an outlet for a flow of fluid from the receiving chamber 139, the housing 121 is provided with an outlet passage. Such outlet passage, in the present instance, comprises a transverse bore 143 in the upper end of the housing 121, the passage 143 communicating with the receiving chamber 139 at a point above the ring member 131. The upper end of a longitudinally extending bore 144 intersects the transverse bore 143, the outer end of the latter being closed by a plug 145. The lower end of the bore 144 constitutes an outlet and is enlarged and threaded as at 146 to receive an oulet flow fitting, such as the fitting 46 of the previously described embodiment.

The flowmeter illustrated in FIGS. 5 and 6 also includes novel variable area orifice means, indicated generally at 150, for connecting the pressure chamber 138 with the receiving chamber 139 to measure the rate of fluid flow therebetween as a function of the position of the lower end of the bellows 126 and the pressure difference between the chambers 138 and 139. The variable orifice means 150, in the present instance, is located centrally of the annular member 127 and comprises an orifice or opening 151 formed in an insert in the form of an annular plate 152 mounted in the lower end face of the annular member 127, and a fixed member 153 mounted in the housing 121. The member 153 has a portion 154 of varying cross sectional area, such portion in this instance tapering toward its upper end and extending into the orifice 151 coaxially therewith in the manner of the previous embodiment.

Thus, as the lower end of the bellows 126 moves upwardly, the effective size of the orifice 151 is increased. The member 153 preferably has a lower portion 155 which is threaded into a longitudinal bore 156 in the lower end of the housing 141 centrally of the boss 134, the upper end of the lower portion 155 providing a shoulder 149 at the lower end of the tapered portion 154, which forms a seat for limiting downward travel of the ring member 127. The lower end of the bore 156 may be closed by a plug 157. Preferably, the maximum diameter of the tapered portion 154 is such that it does not contact the margin of the opening 151 in the plate 152 when the annular member 127 is in its lowermost position. Instead, a slight clearance is maintained therebetween and the end face of the plate 152 seats on the shoulder 149 of the member 153. Such relationship prevents scoring of the tapered portion 154 and consequently inaccurate readings. Because of the fact that the plate 152 is of relatively short axial thickness, wall effects of the opening or orifice 151 are minimized.

The yoke portion 129 of the bellows assembly 122 includes a pair of upwardly extending transversely spaced legs 163 located within the interior of the bellows 126. The upper ends of the legs 163 are integrally connected to a hub portion 164 which is centrally axially bored to receive the lower end of a rod 167. The length of the legs 163 is such that the hub portion 164 is spaced a substantial distance from the orifice 151 so as not to interfere with the flow of fluid therethrough. The upper end, indicated at 168, of the rod 167 extends through a guide bushing 169 mounted in the cap member 124 for connection with actuating linkage of an indicating means, in the manner of the previous embodiment. Annular seal means in the form of an O-ring 170 may be disposed around the rod 167 for engagement with the inner end face of the guide bushing 169 to prevent fluid leakage at this point. A washer 171 may be mounted on the rod 167 beneath the O-ring 170, and a coil spring 172 may be mounted around the rod 167 and between the washer 171 and hub portion 164 of the yoke 129 to hold the O-ring 170 seated.

With the foregoing construction, it will be apparent that supply of fluid under pressure entering the chamber 138 from the inlet 141 will act upon the lower face of the annular member 127 and annular plate 152, and against the weight of the bellows assembly 122 and the force of the coil springs 161 and 171, to cause the plate 152 to move off the shoulder 149 and thus permit flow through the orifice 151. The lower end of the bellows 126 will thus move upwardly to an equilibrium position where the aforementioned forces are counterbalanced by the force of the difference in pressure in the chambers 138 and 139 acting on the exposed end face area of the lower end of the bellows 126. Such pressure difference of course depends upon the size of the variable area orifice 151 which increases with upward movement of the lower end of the bellows 126.

The flowmeter illustrated in FIGS. 5 and 6, while being capable of accurately indicating fluid flow rates over a wide range of flows, is particularly well suited for indicating low fluid flow rates. This is due to the provision of the loosely fitting bellows 126 which eliminates sliding wall friction. Moreover, use of a bellows eliminates difficulties in providing a seal around a piston, particularly difficulties arising from heat and corrosive gases.

I claim:
1. A flowmeter comprising
   (a) an elongated housing having a cylindrical bore therein,
   (b) a slidably mounted piston in said bore and defining a pressure chamber at one end of said housing at one side of the piston and a receiving chamber at the other end of the housing at the other side of said piston,
   (c) said housing having an inlet communicating with said pressure chamber and an outlet communicating with said receiving chamber, said inlet being adapted to be connected to a source of fluid under pressure and said outlet being adapted to be connected to a point of use for said fluid,
   (d) fixed orifice means associated with said inlet for reducing the pressure in said pressure chamber,
   (e) adjustable orifice means associated with said outlet for controlling the rate of flow to the point of use,
   (f) said piston having a centrally disposed opening therein connecting said pressure chamber with said receiving chamber,
   (g) an elongated member mounted in said housing and having a tapered portion extending into said opening to define a variable area orifice, the area of said variable orifice increasing upon movement of said piston away from said one end of said housing in response to a pressure difference in said chambers,
   (h) means urging said piston toward said one end of said housing, and
   (i) means responsive to the position of said piston for indicating the rate of flow of fluid between said inlet and said outlet.
2. A flowmeter according to claim 1, in which a tubular insert having a finished inner surface is mounted in said housing and said piston is movably mounted in said tubular insert.
3. A flowmeter according to claim 2, in which said piston is provided with an annular recess, and an O-ring is mounted in said annular recess in engagement with said inner surface to provide a seal around said piston.
4. A flowmeter, comprising
   (a) a housing having an inlet adapted to be connected to a source of fluid under pressure and an outlet adapted to be connected to a point of use for said fluid,
   (b) movable pressure responsive means in said housing defining a pressure chamber at one end of said housing at one side of the pressure responsive means and a receiving chamber at the other side of said pressure responsive means, said inlet communicating with said pressure chamber and said outlet communicating with said receiving chamber,
(c) said pressure responsive means being urged toward said one end,
(d) said pressure responsive means having an unobstructed opening therein and a tapered elongated member mounted in said housing and extending into said opening, said pressure responsive means being movable toward said one end when the pressure difference between said chambers decreases and being movable toward said other end when the pressure difference between said chambers increases,
(e) stop means for limiting movement of said pressure responsive means toward the larger end of said tapered member to maintain the margin of said opening radially spaced from said member throughout the range of movement of said pressure responsive means,
(f) means responsive to the position of said pressure responsive means for indicating the rate of fluid flow through said meter, and
(g) said elongated member having a length such that said pressure responsive means moves beyond the end of said member whereby said member is completely withdrawn from said opening leaving said opening unobstructed on pressure surges in said pressure chamber to quickly equalize the pressures in said chambers.

References Cited by the Examiner

UNITED STATES PATENTS

| | | | |
|---|---|---|---|
| 1,416,220 | 5/1922 | Long et al. | 73—210 |
| 2,220,496 | 11/1940 | Ringelstetter | 73—210 |
| 2,647,402 | 8/1953 | Ibbott | 73—210 |
| 2,727,388 | 12/1955 | Ekstrom | 73—208 |

RICHARD C. QUEISSER, *Primary Examiner.*

DAVID SCHONBERG, *Examiner.*